Aug. 1, 1933.        A. E. BREWERTON              1,920,241
                      GYROSCOPIC COMPASS
                     Filed Nov. 16, 1931         2 Sheets-Sheet 1

INVENTOR
ARTHUR E BREWERTON
BY
Herbert H. Thompson
ATTORNEY.

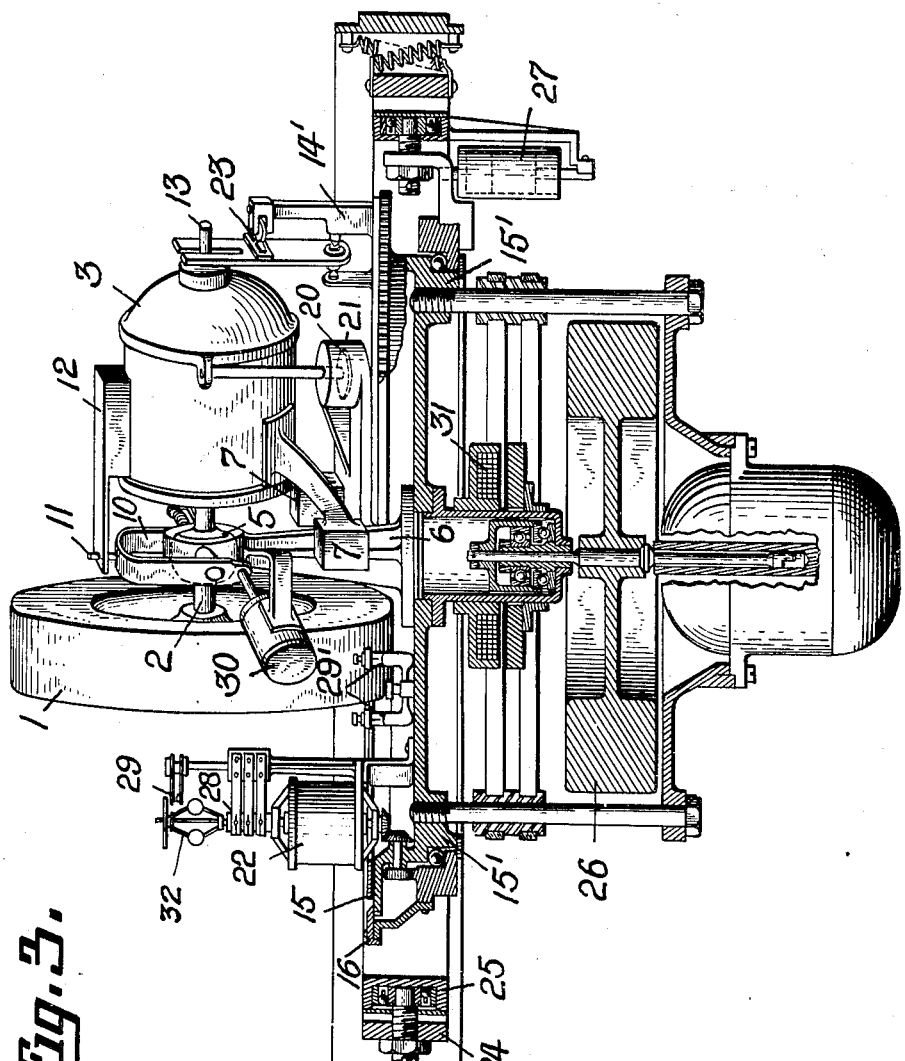

Patented Aug. 1, 1933

1,920,241

UNITED STATES PATENT OFFICE 1,920,241

GYROSCOPIC COMPASS

Arthur E. Brewerton, Purley, England, assignor to Sperry Gyroscope Company, Inc., Brooklyn, N. Y., a Corporation of New York Application November 16, 1931, Serial No. 575,235, and in Great Britain July 26, 1930

7 Claims. (Cl. 33—226.)

In my prior patent for gyro compasses No. 1,495,769, dated May 27, 1924, I described a type of gyroscopic compass which was characterized by the use of a gyroscope mounted upon a member which conveyed the necessary driving power to the wheel and provided freedom about the vertical and horizontal axes.

My present invention relates to gyro compasses possessing similar characteristics and in addition it provides means for eliminating or reducing the errors due to changes of course and/or speed of the ship. In my former patent specification I confined my description to a compass having a wheel capable of angular movement relative to the motor and I now propose a modification to the invention in which the motor and the wheel are mutually supported upon a member which conveys the necessary driving torque from the motor to the wheel and affords freedom to angular movement about two axes in addition to the axis of rotation.

In one form the invention consists, so far as the design of the special gyroscope is concerned, in a motor having a long shaft extension with a wheel at the extremity opposite to the motor. In this instance the shaft is provided with a spherical portion situated at the point of balance between the motor and the wheel. This spherical portion rotates in a spherical bearing which forms the means of support for the gyroscope. I have found that when a spherical member of this nature rotates in a suitable bearing, extreme freedom to angular movement is afforded about the other two axes.

As an alternative to the spherical portion on the shaft, I may use a type of ball bearing which rotates in a spherical formed outer race.

One main object of this invention is to provide a form of support which is particularly free from friction and although I prefer to support the gyroscope on a spherical portion on the driving shaft at the point of balance between the motor and the wheel I foresee that it would be possible to mount the wheel and the motor upon a spherical member and bearing, one of which is rotated by some external source of power.

A construction in accordance with the present invention will now be described with reference to the drawings accompanying the application.

Fig. 3 is a perspective view, partly in section, of a gyroscopic compass made according to my invention and embodying several modifications and improvements over the form shown in Fig. 1.

Figure 1:
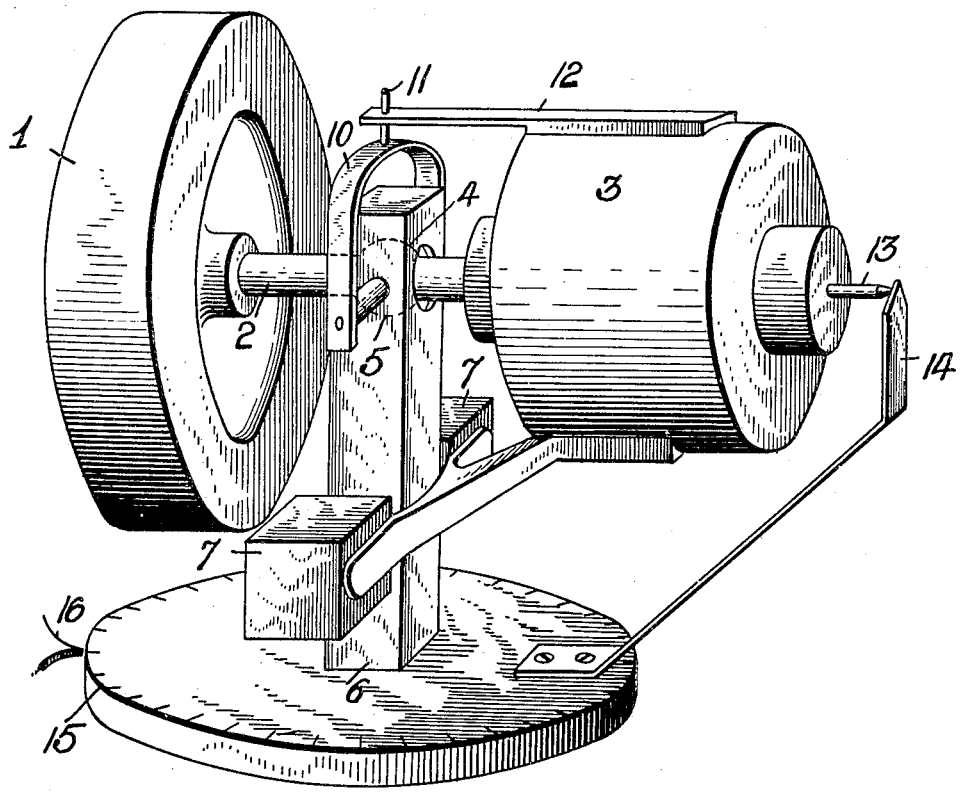
Fig. 1 is a perspective view in diagrammatic form of a gyro compass constructed in accordance with my invention.

The construction of an elementary form of compass employing this type of gyroscope is indicated in Fig. 1, in which the wheel 1 is mounted upon the shaft 2 which forms part of the electric motor 3. Between the motor 3 and the wheel 1 is a spherical portion 4 of the shaft 2 which runs in a spherical bearing 5 which forms part of the supporting stand 6. In order to prevent the frame of the motor rotating when current is applied, two pendulous weights 7 are attached to the motor frame so that the driving torque reacts against gravity. These weights 7 also serve to control the gyroscope and cause it to operate as a compass.

The operation of this instrument is as follows. Assuming that the gyroscopic element has been suitably balanced and is set running with its axle horizontal and not in the plane of the meridian: in these circumstances the gyro element will, according to well known principles and by reason of the extreme freedom afforded by the spherical members 4 and 5, tilt away from the horizontal position. When this tilt occurs the pendulous weights 7 impose a torque upon the gyroscope and cause precession through the plane of the meridian in an elliptical orbit.

In order to ensure that gyroscope will ultimately settle in the plane of the meridian it is necessary to provide some form of damping.

Figure 2:
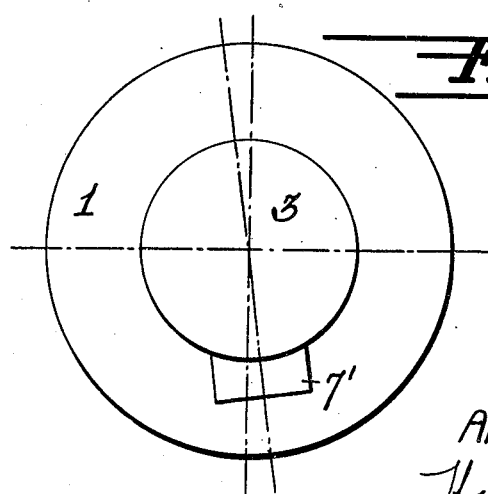
Fig. 2 is a diagram illustrating the action of the forces by which damping is secured.

One method of applying the damping couple will be explained in connection with Fig. 2. When the gyro is running at a constant speed (say clockwise when viewed from the motor end) the torques acting on the rotating parts are—

(1) $+E$, the electromagnetic torque on the armature of the motor 3.

(2) $-F_A$, friction in the motor-armature bearings.

(3) $-W_A$, windage between the armature and casing of motor 3.

(4) $-F_S$, friction in the spherical bearings.

(5) $-W_G$, windage on the gyro 1.

Hence, since the speed is constant it follows that $-E-F_A-W_A-F_S-W_G=0$. Consider next the casing of the motor 3. The torques acting on it are—

(1) $-E$ (2) $+F_A$ (3) $+W_A$ and since $-E+F_A+W_A=-F_S-W_G$ and so is not zero, it follows that the casing of the motor will turn around the axis 2.

This causes tilting of the weights 7 in a plane perpendicular to the spin axis 2 and so imposes on the casing a torque +T about a horizontal axis i.e. the axis of spin.

The residual torques on the casing are now seen to be— —Fs—WG about the spine axis, and +T about a horizontal axis, and these can only produce equilibrium if the spin axis is horizontal.

Hence, when the gyro axis 2 is tilted, there must be a torque D acting on the casing of the motor 3 which together with the above two torques will produce equilibrium. This torque can only be produced by pressure on the casing of the motor 3 at the armature bearings and will, therefore, be in a plane containing the spin axis and perpendicular to the vertical plane through the spin axis. The sense of this torque is counter-clockwise viewed from above.

The reaction of this torque D is taken by the gyro wheel 1 so that when the gyro axis 2 is tilted there will be, acting on the gyro, a torque D, clockwise viewed from above, which will produce a tilting precession of the gyro axis reducing the tilt, thus causing the gyro to be damped and to come to rest in the plane of the meridian after a series of diminishing oscillations.

This method of damping has certain advantages in that there is no mechanical connection between the gyro system and any outside member as the damping torque is derived from the electrical energy delivered to the motor.

In the above method of damping, the damping factor varies according to the torque given by the motor and in order to avoid this variation, I cause the pendulous weights 7 to be inclined from the vertical by a definite amount. In order to do this I may fit a Cardan ring 10 (or half ring) which is pivoted about the axial and horizontal centers of the spherical members 4 and 5. This Cardan ring 10 carries a pin 11 which engages in a member 12 fixed upon some part of the gyroscope system and causes the pendulous weight to be maintained in its vertical position or at any predetermined amount out of the vertical position according to the position of the pin.

Alternatively I may reduce the variations due to varying torque of the motor by a link connection between the motor casing 3 and the support 6, this connection being preferably through a viscous medium such as a vane 20 attached to the casing 3 dipping into an oil trough 21 mounted upon the pillar 6 (Fig. 3).

The instrument illustrated in Fig. 1 may be used as a gyro compass on land, but as the gyro system has only a limited angular motion in the spherical bearing it is necessary to follow up the supporting bearing by hand when it gets out of alignment with the gyro system as indicated by the relative positions of the pin 13 and pointer 14. If the supporting bearing is followed up in this manner the gyro system will ultimately settle with its axle pointing north and south and bearing can be read off by means of the graduated ring 15 and pointer 16. In order to apply this gyroscope system to a compass for use at sea, I arrange for it to be mounted upon a turntable 15' which is kept in alignment with the gyroscope by means of a motor 22 or the like which is controlled by contacts 23 actuated by means of the projecting pin 13.

This turntable is mounted in a gimbal system 24—25 which is stabilized by means of a gyroscope 26 so that the period of oscillation is increased to an amount which is greater than the roll period of the ship. By this means the compass is prevented from swinging in its gimbals in response to the short period acceleration forces due to the ship's roll and the turntable is kept substantially horizontal or is allowed to oscillate above a truly horizontal plane under the control of the stabilizing gyroscope. I may attach to the stabilizing gyroscope 26 or its system some means of damping the natural conical precession which results from any disturbance. This may take the form of a viscous fluid damping device 27 or I may add to the friction of the gimbal bearings sufficiently to damp out the oscillations.

The control pendulum attached to the orientating gyroscope system is prevented from swinging in the plane of the wheel by means of the pin connection 11 or by the viscous connection 20—21 previously referred to or both and consequently the error which would otherwise be caused by the rolling of the ship is avoided.

In order to use this instrument as a compass, I provide upon the rotating turntable a suitably graduated ring 15 which is read against a lubbers pointer 16 attached to the non-rotating part supporting the turntable and if distant instruments are required to be operated I provide a step-by-step transmitter 28 or its equivalent and arrange for it to be operated directly or indirectly by means of the motor 22 operating the turntable. It is well known in gyroscopic compasses that when a ship travels upon a course which is not East and West, the North—South component of the course is added vectorially to the earth's rotation and the compass indicates a resultant direction. It is also well known that the pendulous control system can be so proportioned that when the northerly component of the course is varied the acceleration forces acting upon the control system during the change of speed or direction bring the compass into the new settling position which is generally referred to as ballistic deflection.

In most types of gyroscopic compasses the acceleration forces cause a couple to act about the vertical axis as well as upon the horizontal axis with the result that when the gyroscope arrives at its new position the axis is tilted; and this tilt has to be eliminated resulting in subsequent oscillations in azimuth and consequent error. This error assumes detrimental proportions when the rate of change of course and/or speed is high. In order to eliminate this error I provide a centrifugal governor device 32 which closes an electric contact 29 when the change of course exceeds a predetermined amount and contacts 29' which are closed on a change of speed which exceeds a predetermined amount. When this electric contact is closed by either of the above mentioned contact devices I arrange for a solenoid 30 to be energized and impart axial (i. e. lateral) movement to the cardan ring 10 in such a manner that the pin 11 maintains the pendulous control weight 7 in a central position so that acceleration forces act only about the horizontal axis—in other words so that the gyroscope is undamped. Where I employ a viscous link connection between the motor casing 3 and the support I arrange to bring the pendulous weight to a central position by shutting off or reducing the power supplied to the motor 3 or by some other suitable means during the change of course and/or speed. I also provide a second solenoid 31 or the like which is attached to the stabilized gimbal system and I arrange that, when the contact 29 is closed the solenoid raises the center of gravity of the gimbal system so that it is in neutral equilibrium or has a very long period of oscillation during the change of course and/or speed.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic compass, a rotatable element, a spinning motor for spinning the same about a normally horizontal axis and having its armature mounted on said element and its stator journaled thereon and supported thereby, pendulous means secured to the stator for preventing reactive rotation thereof and for damping the compass, and a spherical bearing for supporting said element, armature and stator for turning about a vertical axis and for oscillation about a horizontal axis at an angle to the spinning axis and also furnishing the spinning bearing for said element and armature.

2. In a gyroscopic compass, a rotor and normally horizontal rotor shaft, a spinning motor for said rotor having its armature mounted on said shaft and its stator journaled thereon, a spherical bearing supporting said shaft at a mid point for rotation about a normally horizontal axis, said bearing also supporting said shaft, armature and stator for turning about a vertical axis and for oscillation about a horizontal axis, and means for imparting a gravitational control to said compass.

3. In a gyroscopic compass, the combination with the gyroscopic rotor and shaft therefor, a single spherical bearing for universally supporting the shaft for spinning about one horizontal axis, oscillation about another horizontal axis and turning about a vertical axis, a stator for spinning said rotor, the weight of which is also supported on said shaft and bearing, rotor bearings between said stator and rotor shaft, pendulous means for preventing reactive turning of said stator, and a follow-up support for said spherical bearing.

4. In a gyroscopic compass, a rotating element, a spinning motor for spinning the same about a normally horizontal axis and having its armature mounted on said element and its stator journaled thereon and supported thereby, a spherical bearing for supporting said element, armature and stator for turning about a vertical axis and for oscillation about a horizontal axis at an angle to the spinning axis and also furnishing the spinning bearing for said element and armature and means for imparting pendulosity to said stator about both said horizontal axis and the spin axis whereby both damping and meridian seeking properties are secured.

5. In a gyroscopic compass, the combination with the gyroscope, a single spherical bearing for universally supporting the gyroscope for spinning about one horizontal axis, oscillation about another horizontal axis and turning about a vertical axis, a stator for spinning said gyroscope, the weight of which is also supported on said bearing, rotor bearings between said stator and rotor, pendulous means for preventing reactive turning of said stator whereby damping is also secured, and means for shutting off the power to said stator during turning of the ship to eliminate the damping error.

6. In a gyroscopic compass, the combination with the gyroscope, a single spherical bearing for universally supporting the gyroscope for spinning about one horizontal axis, oscillation about another horizontal axis and turning about a vertical axis, a stator for spinning said gyroscope, the weight of which is also supported on said bearing, rotor bearings between said stator and rotor, means for imparting pendulosity to said stator about both said horizontal axis and spin axis whereby the reaction from the rotor is absorbed and both damping and meridian seeking properties are secured, and means for limiting the inclination of said stator about the spin axis due to rotor reaction for maintaining the damping factor constant.

7. In a gyroscopic compass, the combination with the gyroscope, a single spherical bearing for universally supporting the gyroscope for spinning about one horizontal axis, oscillation about another horizontal axis and turning about a vertical axis, a stator for spinning said gyroscope, the weight of which is also supported on said bearing, rotor bearings between said stator and rotor, pendulous means for preventing reactive turning of said stator, whereby damping is secured, and means for temporarily shifting the relative position of the center of gravity of the gyroscope and said pendulous means to temporarily eliminate damping.

ARTHUR E. BREWERTON.